US007391595B2

(12) United States Patent
Chen

(10) Patent No.: US 7,391,595 B2
(45) Date of Patent: Jun. 24, 2008

(54) SYSTEM AND METHOD FOR BREAKDOWN PROTECTION IN START-UP SEQUENCE WITH MULTIPLE POWER DOMAINS

(75) Inventor: Chun-Ying Chen, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 373 days.

(21) Appl. No.: 11/155,739

(22) Filed: Jun. 20, 2005

(65) Prior Publication Data

US 2006/0087780 A1 Apr. 27, 2006

Related U.S. Application Data

(60) Provisional application No. 60/621,472, filed on Oct. 25, 2004.

(51) Int. Cl.
*H02H 9/00* (2006.01)

(52) U.S. Cl. .......................................................... 361/56

(58) Field of Classification Search .................... 361/56
See application file for complete search history.

(56) References Cited

U.S. PATENT DOCUMENTS

| | | | | |
|---|---|---|---|---|
| 4,670,668 | A * | 6/1987 | Liu | 327/537 |
| 5,742,465 | A | 4/1998 | Yu | 361/111 |
| 6,160,430 | A | 12/2000 | Drapkin et al. | 327/143 |
| 2003/0038666 | A1 | 2/2003 | Wada | 327/530 |

* cited by examiner

*Primary Examiner*—Stephen W Jackson
(74) *Attorney, Agent, or Firm*—Sterne, Kessler, Goldstein & Fox PLLC

(57) ABSTRACT

During start-up of a circuit having a high voltage supply and a low voltage supply, a backup bias generator (BBG) is used to avoid burnout and exceeding a breakdown voltage. The high voltage supply is powered on before the low voltage supply. The BBG generates bias in response to the high voltage supply being powered on. Once the low voltage supply is powered on and is stable, the BBG is shut down so that it does not interfere with normal operation of the circuit. The circuit can be separated into high and low supply domains without breakdown issues during power start-up, allowing for power and area optimization.

24 Claims, 6 Drawing Sheets

SYSTEM AND METHOD FOR BREAKDOWN PROTECTION IN START-UP SEQUENCE WITH MULTIPLE POWER DOMAINS

CROSS-REFERENCE TO RELATED APPLICATION

This application claims the benefit of U.S. Provisional Application No. 60/621,472, filed Oct. 25, 2004, which is incorporated herein by reference in its entirety.

BACKGROUND OF THE INVENTION

1. Field of the Invention

The present invention relates generally to circuits, and more specifically to power sequencing in multiple power domain circuits.

2. Background Art

Analog circuit applications that require high speed and/or low distortion often necessitate a higher supply voltage as compared to slower or noisier applications. The higher supply voltage can give devices of an application larger head room and lower junction capacitance, resulting in better linearity and faster speed. However, the supply voltage is usually limited so as to not exceed the breakdown voltage of semiconductor components of the analog circuit. With cascaded devices, though, the supply voltage is not necessarily limited to a value below the breakdown voltage. As long as the voltage across each cascaded device does not exceed the breakdown voltage of the respective device, the supply voltage can be increased.

Analog circuits usually have more than one cascade of devices from supply to ground. Thus, the supply voltage can be larger than the breakdown voltage of a single device. Although high speed or high performance circuits may require a high voltage supply, slower portions of the circuit, such as bandgap or bias blocks, can be operated using lower supply voltages. To save power and area, two or more supply voltages may be used in a single chip.

However, circuits with multiple supply voltages generally have problems when power is switched on. If a lower voltage supply is turned on before a higher voltage supply, devices may burn out due to current overflow. If a higher voltage supply is turned on before a lower voltage supply, devices may exceed breakdown voltage because no reference is available upon which to base biasing of the devices.

What is needed, then, is a system and method to enable start-up of circuits having multiple power supplies without burning out or exceeding a breakdown voltage.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

I. Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Moreover, firmware, software, routines, instructions, etc. may be described herein as performing certain actions. However, it should be appreciated that such descriptions are merely for convenience and that such actions in fact result from computing devices, processors, controllers, or other devices executing the firmware, software, routines, instructions, etc.

Figure 1:
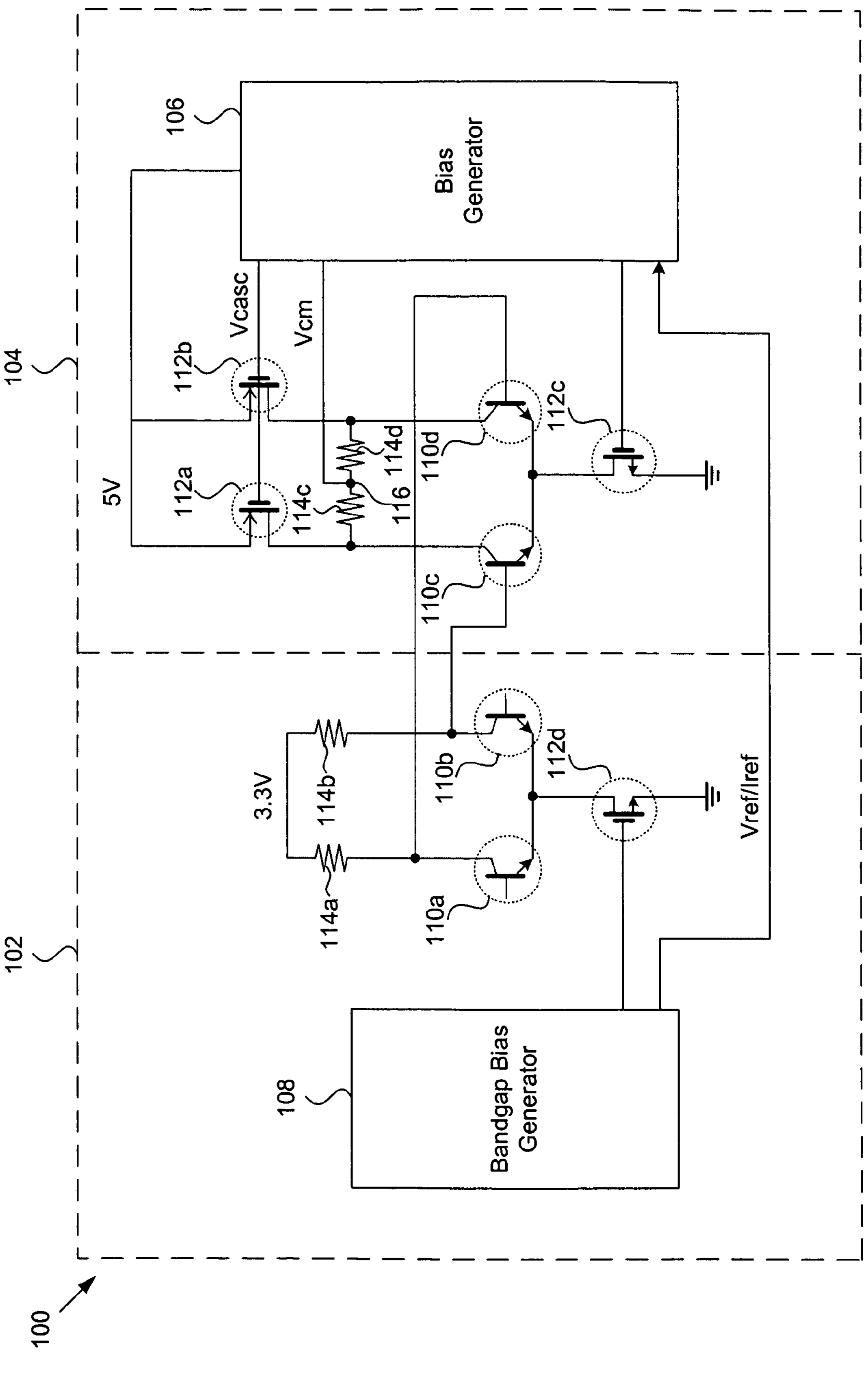
FIG. 1 is a schematic of an example circuit having multiple power domains.

FIG. 1 is a schematic of an example circuit 100 having multiple power domains. Circuit 100 includes a bias generator 106, a bandgap bias generator 108, bipolar transistors 110*a-d*, metal oxide semiconductor (MOS) transistors 112*a-d*, and resistors 114*a-d*. In the embodiment of FIG. 1, circuit 100 utilizes a BiCMOS process for illustrative purposes. Bipolar transistors 110*a-d* each have a base, a collector, and an emitter. MOS transistors each have a gate, a drain, and a source. For simplicity, bipolar transistors 110*a-d* and MOS transistors 112*a-d* each have a breakdown voltage of approximately 3.3V.

In FIG. 1, circuit 100 includes a low power domain 102 and a high power domain 104. For illustrative purposes, low power domain 102 utilizes a 3.3V supply voltage, and high power domain 104 utilizes a 5V supply voltage.

In low power domain 102, resistor 114*a* is coupled between the 3.3V supply voltage and a collector of bipolar transistor 110*a*. Resistor 114*b* is coupled between the 3.3V supply voltage and a collector of bipolar transistor 110*b*. An emitter of bipolar transistor 110*a* and an emitter of bipolar transistor 110*b* are coupled to a drain of MOS transistor 112*d*. A gate of MOS transistor 112*d* is connected to bandgap bias generator 108.

In high power domain 104, a source of MOS transistor 112*a* and a source of MOS transistor 112*b* are connected to the 5V supply voltage. A drain of MOS transistor 112*a* is coupled to a first terminal of resistor 114*c* and a collector of bipolar transistor 110*c*. A drain of MOS transistor 112*b* is coupled to a first terminal of resistor 114*d* and a collector of bipolar transistor 110*d*. A gate of MOS transistor 112*a* and a gate of MOS transistor 112*b* are connected to bias generator 106. As shown in FIG. 1, bias generator 106 provides a cascade voltage, $V_{casc}$, to the gates of MOS transistors 112*a* and 112*b*. A second terminal of resistor 114*c* and a second terminal of resistor 114*d* are coupled to each other at node 116. In FIG. 1, bias generator provides a common mode voltage, $V_{cm}$, to node 116. An emitter of bipolar transistor 110*c* and an emitter of bipolar transistor 110*d* are coupled to a drain of MOS transistor 112*c*. A gate of MOS transistor 112*c* is connected to bias generator 106. A source of MOS transistor 112*c* is coupled to a ground potential.

Low power domain 102 and high power domain 104 can be connected in a variety of ways. In FIG. 1, the collector of bipolar transistor 110*a* is coupled to a base of bipolar transistor 110*d*. The collector of bipolar transistor 110*b* is coupled to a base of bipolar transistor 110*c*. Bandgap bias generator 108 provides a reference voltage, $V_{ref}$, and/or a reference current, $I_{ref}$, to bias generator 106. Bandgap bias generator 108 provides a substantially constant voltage, which varies less than that of a conventional power supply. For example, a voltage of a conventional power supply may vary by 5-10%. Bandgap bias generator 108 consumes less power and/or area, as compared to a conventional power supply. For instance, bandgap bias generator 108 may not have a head room requirement or a speed requirement.

During normal operation, bias generator 106 biases MOS transistors 112*a-c* and bipolar transistors 110*c-d* in a "safe region", meaning that these transistors are biased so that they do not operate in a saturation region. Thus, transistors 112*a-c* and 110*c-d* do not ordinarily encounter breakdown during normal operation.

Figure 2:
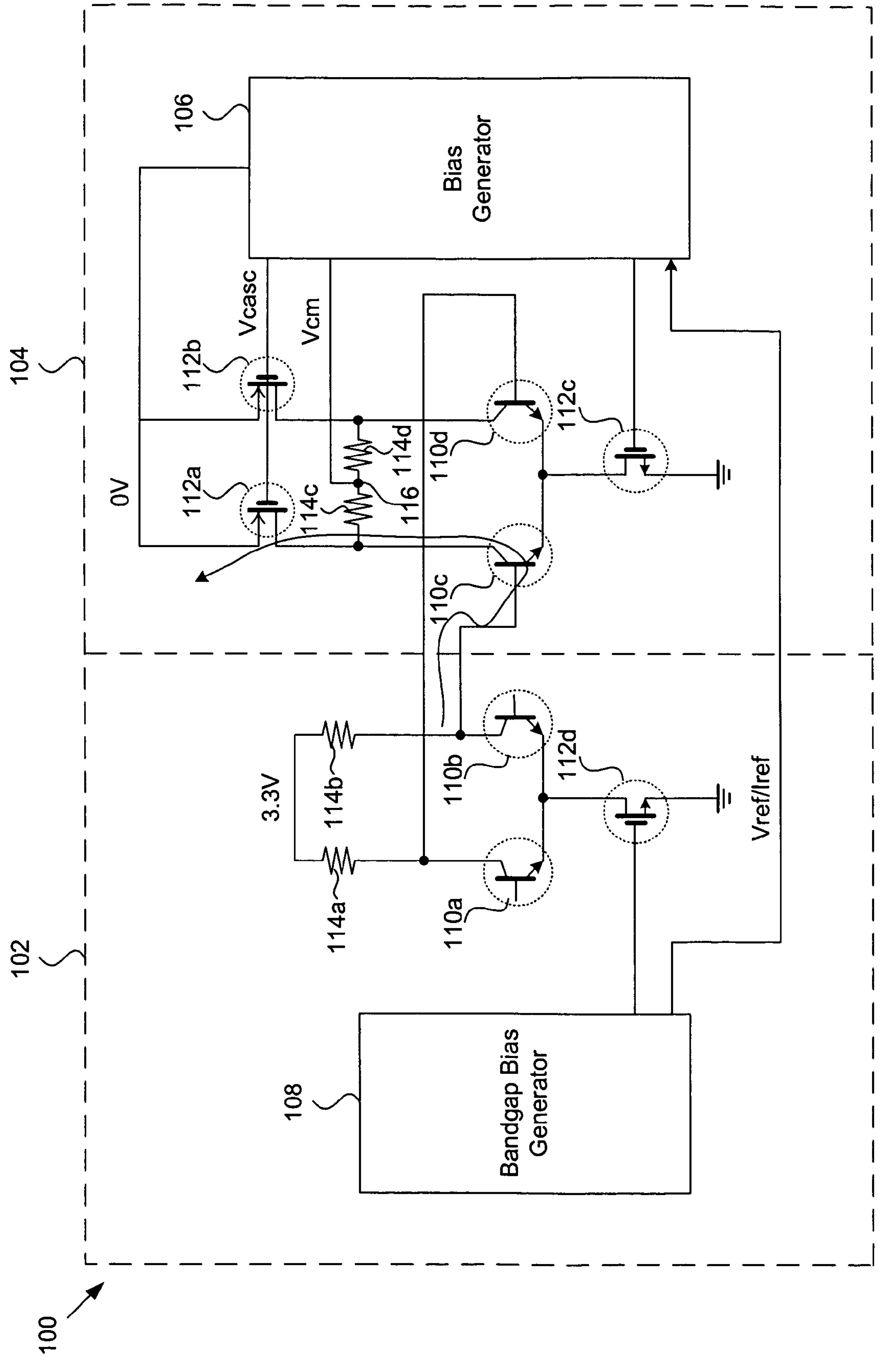
FIG. 2 is another schematic of the example circuit in FIG. 1, illustrating a consequence of turning on a lower supply voltage before a higher supply voltage.
Figure 3:
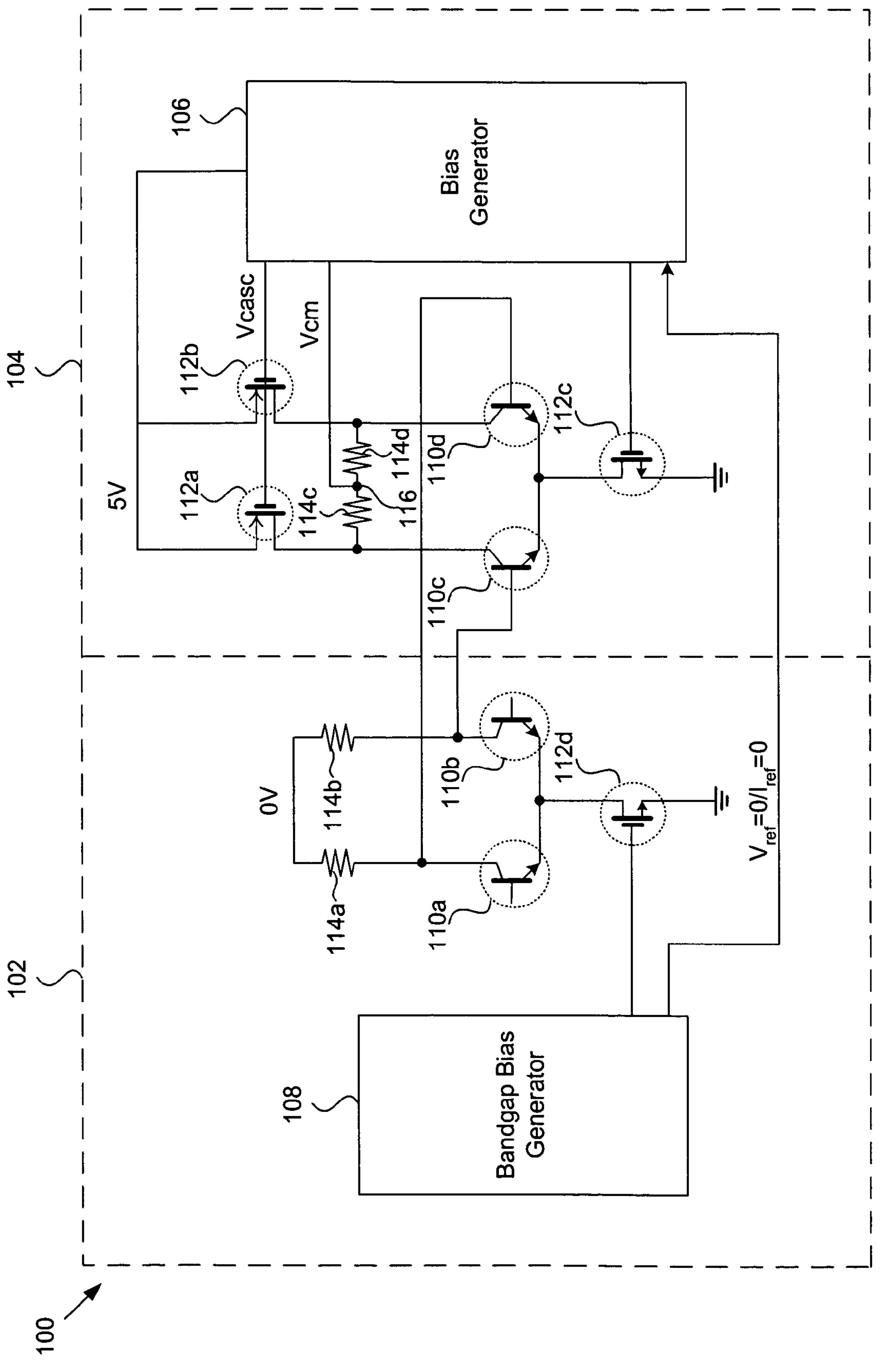
FIG. 3 is yet another schematic of the example circuit in FIG. 1, illustrating a consequence of turning on a higher supply voltage before a lower supply voltage.

However, a circuit such as circuit 100 can encounter problems during power start-up. FIGS. 2 and 3 illustrate two potential scenarios that may arise during power start-up of circuit 100. In FIG. 2, a lower supply voltage is turned on before a higher supply voltage. As shown in FIG. 2, when the 3.3V supply voltage is initially turned on, the 5V supply voltage is not turned on. The 5V supply voltage initially supplies 0V. Thus, bipolar transistors 110*c-d* become saturated (i.e., go into saturation). P-n junctions between bases and collectors of bipolar transistors 110*c-d* become forward biased, and MOS transistors 112*a-b* behave as diodes connected to a 0V source. As illustrated in FIG. 2, a current flows from base to collector in bipolar transistors 110*c-d*. The current is likely large enough to burn out bipolar transistors 110*c-d*. Thus, powering up the 3.3V supply voltage before the 5V supply voltage can irreversibly damage circuit 100.

FIG. 3 illustrates a consequence of turning on a higher supply voltage before a lower supply voltage. In FIG. 3, turning on the 5V supply voltage before the 3.3V supply voltage can cause one or more of MOS transistors 112*a-c* and bipolar transistors 110*c-d* to exceed a respective breakdown voltage. When the 5V supply voltage is initially turned on, the 3.3V supply voltage is not turned on. The 3.3V supply voltage initially supplies 0V. In the embodiment of FIG. 3, bandgap bias generator 108 is powered by the 3.3V voltage supply. Thus, bandgap bias generator 108 initially does not supply a reference voltage or a reference current to bias generator 106. In other words, $V_{ref}$=0V and $I_{ref}$=0 mA when the 5V supply voltage is initially turned on.

Bias generator 106 provides one or more voltages, such as $V_{casc}$ and $V_{cm}$, based on $V_{ref}$ and/or $I_{ref}$. If bias generator 106 does not receive a reference signal (e.g., $V_{ref}$ or $I_{ref}$) from bandgap bias generator 108, then voltages that are provided by bias generator 106 may not be suitable for proper operation of circuit 100. Bias generator 106 is essentially in a "power down" mode when $V_{ref}$=0V or $I_{ref}$=0 mA. Thus, no current flows through bipolar transistors 10*c-d* when the 5V supply voltage is initially turned on. In the absence of a reference signal, voltages provided by bias generator 106 may be any value from 0V to a value of the higher voltage supply. For example, in FIG. 3, $V_{casc}$ and $V_{cm}$ can each be any value from 0V to 5V. Thus, one or more of MOS transistors 112*a-c* and bipolar transistors 110*c-d* may exceed its respective breakdown voltage.

II. Breakdown Protection

Figure 4:
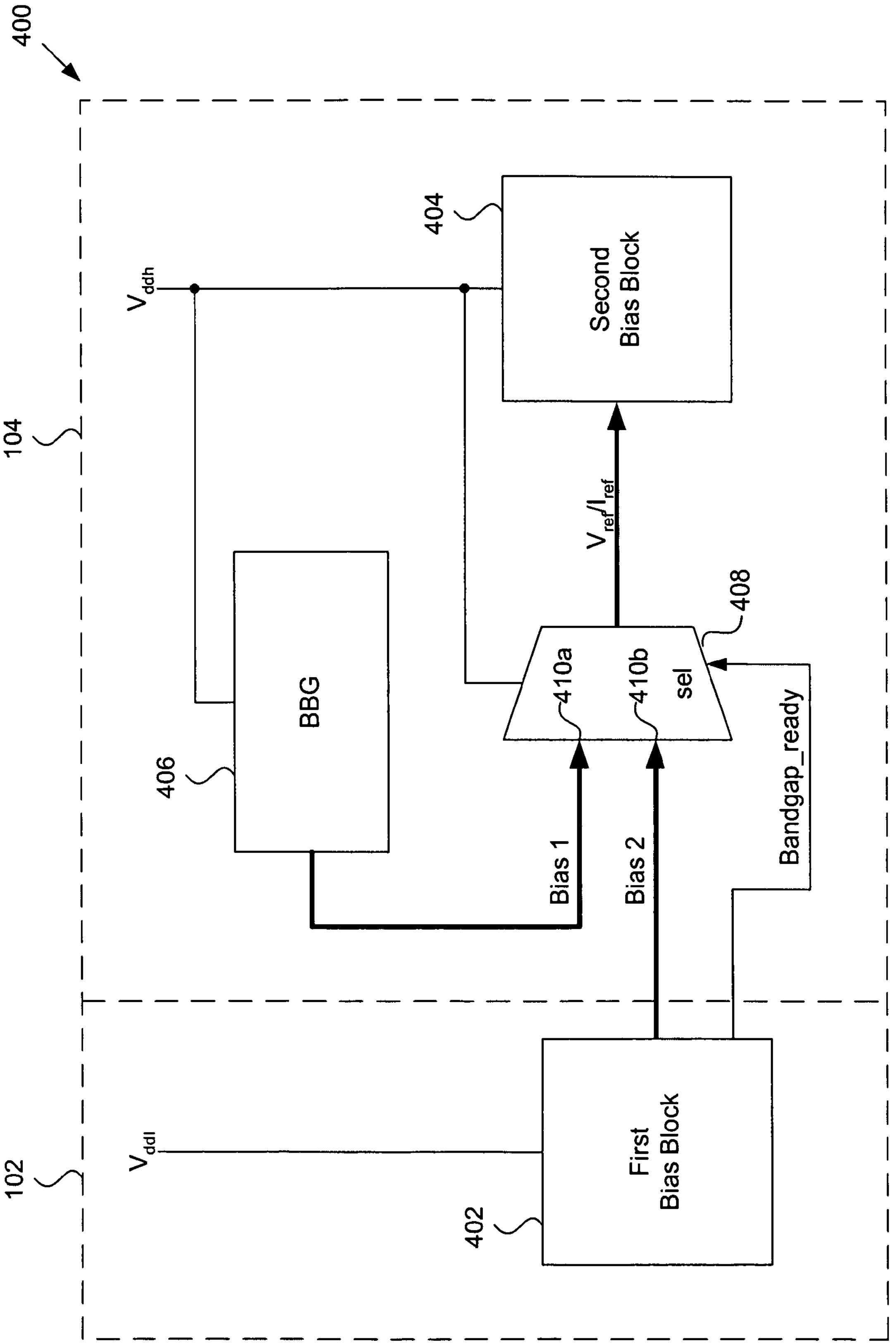
FIG. 4 is a block diagram of a circuit according to an embodiment of the present invention.

FIG. 4 is a block diagram of a circuit 400 according to an embodiment of the present invention. Circuit 400 includes a first bias block 402 (e.g., bandgap bias generator 108), a second bias block 404 (e.g., bias generator 106), a backup bias generator (BBG) 406, and a multiplexer 408. Circuit 400 is a two power domain circuit for illustrative purposes. First bias block 402 is powered by a lower supply voltage, $V_{ddl}$. Second bias block 404, BBG 406, and multiplexer 408 are powered by a higher supply voltage, $V_{ddh}$.

First bias block 402 is in first power domain 102. Second bias block 404, BBG 406, and multiplexer 408 are said to be in the high power domain 104 because each is operable when the supply voltage, $V_{ddh}$, utilized by high power domain 104 is turned on.

Referring to FIG. 4, multiplexer 408 has a first input 410*a* and a second input 410*b*. BBG 406 is operable to provide a first reference signal, Bias1, to the first input 410*a*. First bias block 402 is operable to provide a second reference signal, Bias2, to the second input 410*b*. Multiplexer 408 selects Bias1 or Bias2 based on a Bandgap_ready signal that is provided by first bias block 402.

The value of the Bandgap_ready signal is based on the ability of first bias block 402 to provide a reference signal that is detectable by second bias block 404. The Bandgap_ready signal is set to "0" if first bias block 402 is not sufficiently powered up to provide a reference voltage to second bias block 404. For instance, an amplitude of a signal provided by first bias block 402, such as Bias2 in FIG. 4, may not exceed a predetermined threshold. If the Bandgap_ready signal is "0", multiplexer 408 selects Bias1 to be the reference signal for second bias block 404.

Thus, in contrast to conventional circuits having multiple power domains, breakdown is not exceeded during power up of circuit 400 when $V_{ddh}$ is turned on before $V_{ddl}$. BBG 406 is configured to provide a reference signal to second bias block 404 while $V_{ddl}$ is turned off. BBG 406 can provide the reference signal even after $V_{ddl}$ is turned on, if first bias block 402 is not powered up or stable, for example. Thus, $I_{ref}$ and/or $V_{ref}$ are available, regardless whether first bias block 402 is available.

The reference signal, Bias1, provided by BBG 406 need not necessarily be as accurate as, for example, Bias2, which is supplied by first bias block 402. BBG 406 is tasked not with achieving circuit performance but with merely avoiding breakdown. Although accurate performance is preferred, accuracy is not necessarily required to prevent circuit 400 from exceeding its breakdown limitations. Once $V_{ddl}$ is powered up and stable, BBG 406 can be shut down so as to not interfere with normal operation of circuit 400.

For example, if $V_{ddl}$ is turned on, then first bias block 402 powers up. Once first bias block 402 is powered up sufficiently to provide a reference signal to second bias block 404, the Bandgap_ready signal is set to "1". For instance, an amplitude of Bias2 may exceed a predetermined threshold. The Bandgap_ready signal of "1" indicates that Bias2 is turned on and is stable. If the Bandgap_ready signal is "1", then multiplexer 408 selects Bias2 as the reference signal for second bias block 404.

The Bandgap_ready signal can be provided as an input to BBG 406 to control whether or not BBG 406 is shut down. BBG 406 is powered up when $V_{ddh}$ is turned on. However, when Bias2 is turned on and is stable, BBG 406 need not necessarily provide Bias1 to multiplexer 408. When multiplexer 408 selects Bias2 to be the reference signal for second bias block 404, the Bandgap_ready signal of "1" can instruct BBG 406 to shut down.

Figure 5:
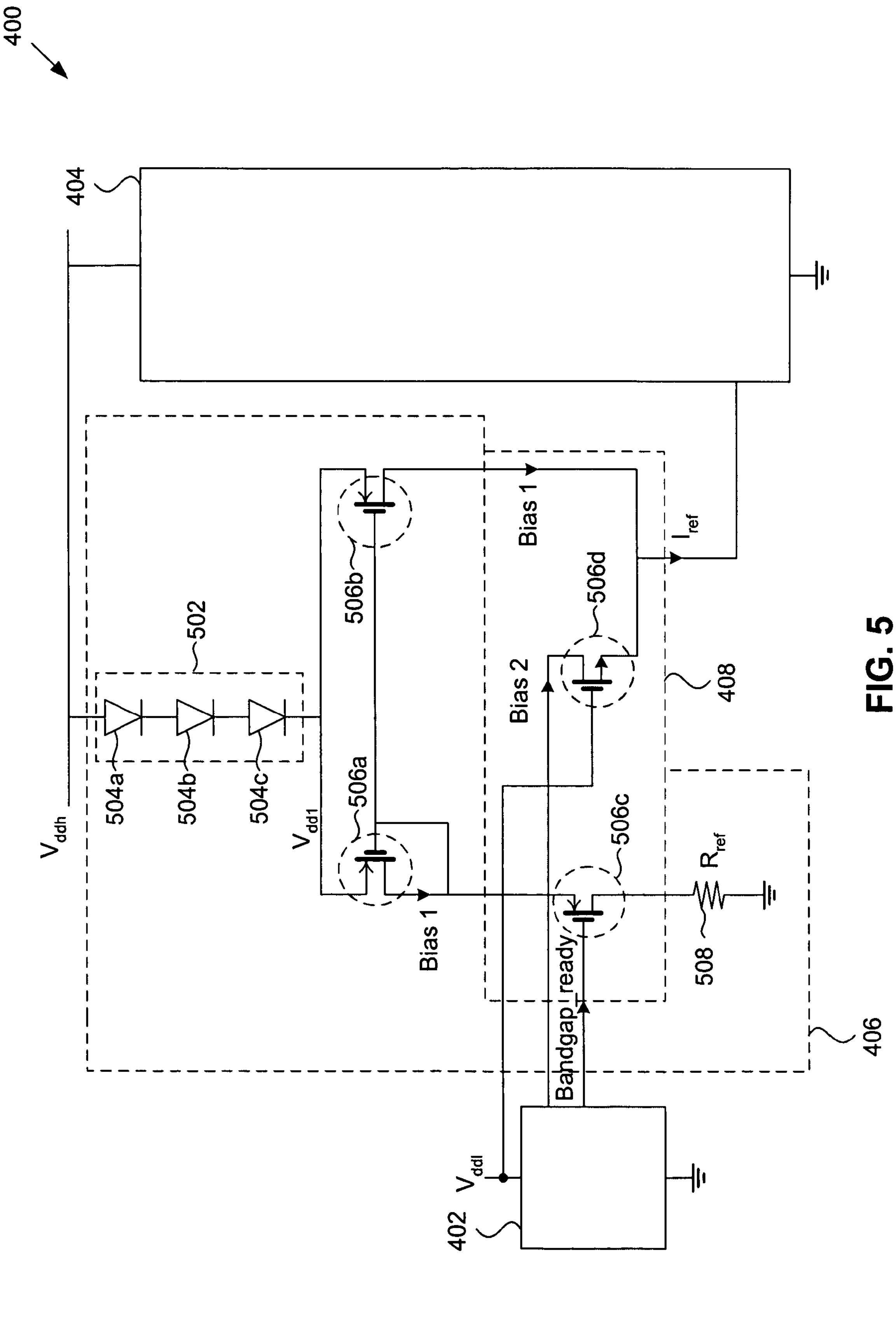
FIG. 5 is an example schematic of the circuit in FIG. 4 according to an embodiment of the present invention.

FIG. 5 is an example schematic of circuit 400 according to an embodiment of the present invention. In FIG. 5, BBG 406 includes a voltage drop circuit 502, MOS transistors 506*a-b*, and resistor 508. Voltage drop circuit 502 is used to drop the higher supply voltage, $V_{ddh}$, to a lower voltage. As shown in FIG. 5, the lower voltage can be substantially equal to the lower supply voltage, $V_{ddl}$, though the scope of the invention is not limited in this respect.

In the embodiment of FIG. 5, voltage drop circuit 502 includes diodes 504*a-c*. Each of diodes 504*a-c* has a voltage drop of approximately 0.7V. Thus, if $V_{ddh}$ is set to be 5.0V, then the lower voltage at the output of voltage drop circuit 502 is approximately 2.9V. This lower voltage allows devices, such as MOS transistors 506*a-b*, of BBG 406 to operate without exceeding their breakdown limitations. For example, if the breakdown voltage of MOS transistors 506*a-b* is 3.3V, then MOS transistors 506*a-b* operating at 2.9V do not exceed the 3.3V breakdown limitation.

Resistor 508, also referred to as $R_{ref}$, controls the drain current of MOS transistor 506*a*. The drain current of MOS transistor 506*a* is labeled as Bias1 in FIG. 5. A lower resistance of resistor 508 provides a higher drain current of MOS transistor 506*a*. A higher resistance provides a lower drain current. MOS transistors 506*a-b* form a current mirror, such that the drain current of MOS transistor 506*b* is substantially the same as the drain current of MOS transistor 506*a*.

Multiplexer 408 includes MOS transistors 506*c-d*, which operate as switches in the embodiment of FIG. 5. When the Bandgap_ready signal is "0", MOS transistor 506*c* in collaboration with MOS transistors 506*a-b* provides Bias1 as reference current, $I_{ref}$. When the Bandgap_ready signal is "1", MOS transistor 506*d* provides Bias2 as $I_{ref}$.

When $V_{ddh}$ is powered on and $V_{ddl}$ is 0V, Bias2 and the Bandgap_ready signal are zero. The Bandgap_ready signal of "0" turns on MOS transistor 506*c*, enabling a bias current Bias1=$(V_{ddl}-V_{th1})/R_{ref}$, which is mirrored as shown in FIG. 5. Thus, $I_{ref}$=Bias1+Bias2=Bias1, because Bias2 is zero. MOS transistor 506*d* blocks Bias1 from flowing back into first bias block 402. Bias1 may vary with process, temperature, and/or supply voltage. However, such variation is tolerable, because avoidance of breakdown is the primary issue.

When the 3V supply voltage powers on, the Bandgap_ready signal goes high (i.e., "1") and turns off MOS transistor 506*c*. MOS transistor 506*d* turns on and provides Bias2 as the reference current, $I_{ref}$. $I_{ref}$ is therefore switched from Bias1 to Bias2, providing a more accurate reference for second bias block 404.

Figure 6:
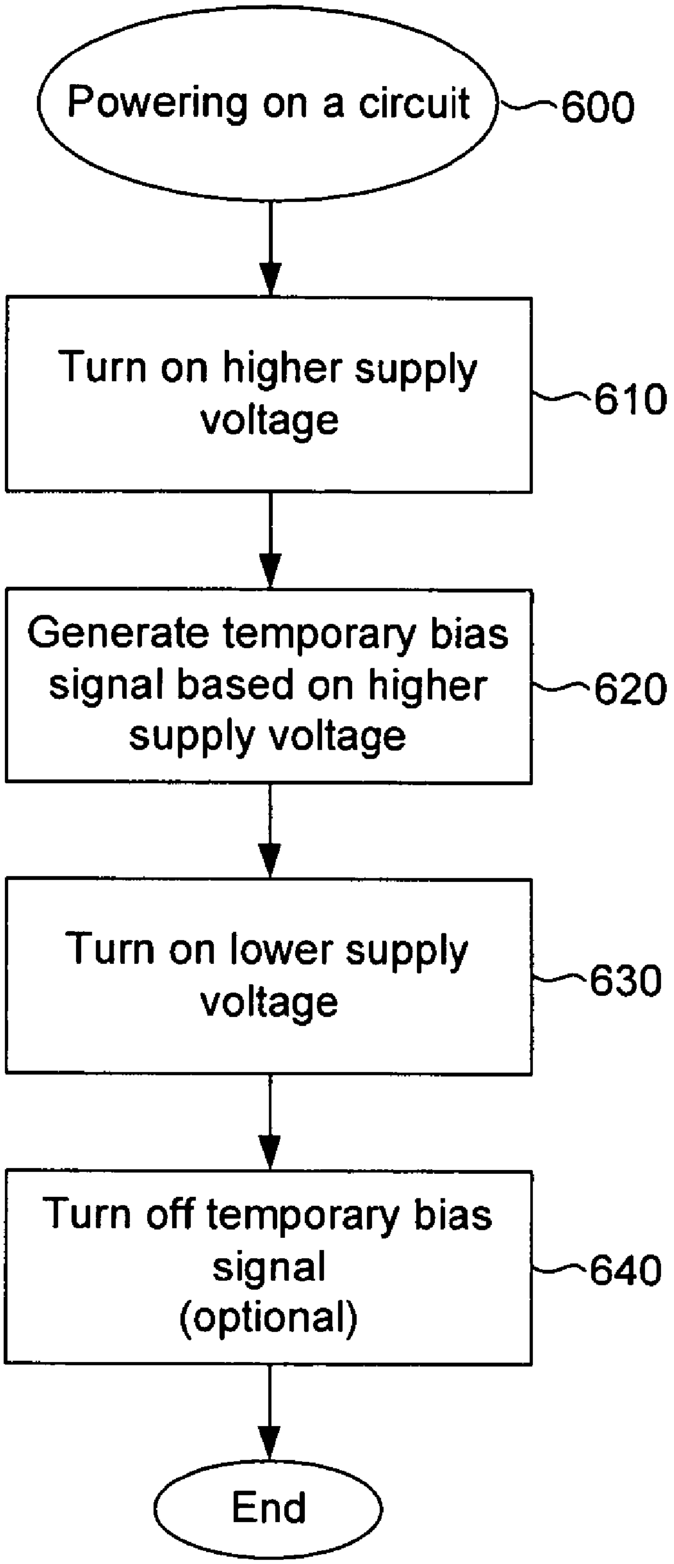
FIG. 6 is a flowchart of a method of powering on a circuit in accordance with an embodiment of the present invention.

FIG. 6 illustrates a flowchart 600 of a method of powering on a circuit in accordance with an embodiment of the present invention. The invention, however, is not limited to the description provided by the flowchart 600. Rather, it will be apparent to persons skilled in the relevant art(s) from the teachings provided herein that other functional flows are within the scope and spirit of the present invention.

Flowchart 600 will be described with continued reference to circuit 400 described above in reference to FIG. 4, though the method is not limited to that embodiment.

Referring now to FIG. 6, the higher supply voltage, $V_{ddh}$, of circuit 400 is turned on at block 610. BBG 406 generates a temporary bias signal based on the higher supply voltage at block 620. BBG 406 generates the temporary bias signal substantially immediately upon $V_{ddh}$ being turned on. The lower supply voltage, $V_{ddl}$, of circuit 400 is turned on at block 630. Bandgap bias generator 108, which is powered by $V_{ddl}$, can generate a bias signal based on $V_{ddl}$. The temporary bias signal may be turned off at block 640. For example, the temporary bias signal may no longer be needed once bandgap bias generator 108 is capable of providing the bias signal based on $V_{ddl}$. The temporary bias signal need not necessarily be turned off. For instance, the temporary bias signal may be disregarded, even if BBG 406 remains powered up.

III. Other Embodiments

The example architectures described herein allow multiple supply voltages in a single chip to power up safely without breakdown issues. However, embodiments of the present invention are not limited to single chip architectures. Persons skilled in the art(s) will recognize that components and/or portions of circuit 100 or 400 may be spread among multiple circuits.

Although circuits 100 and 400 are described as having two power domains, circuits 100 and 400 can have any suitable number of power domains. The power domains can have any values. Power domains of 3.3V and 5V are used herein for illustrative purposes only and are not intended to limit the scope of the present invention. Any ratio of power domains can be used.

According to one embodiment, BBG 406 is included in the high power domain 104 of circuit 100 or 400. In another embodiment, BBG 406 is included in a power domain other than high power domain 104. BBG 406 merely needs to provide a voltage or current that is sufficient to be used as a reference by second bias block 404.

Persons skilled in the art(s) will recognize that the breakdown voltage of MOS transistors 112*a-d* and 506*a-d* and bipolar transistors 110*a-d* need not necessarily be 3.3V. A breakdown voltage can be any value, and one or more transistors can have different breakdown voltages (e.g., 1.8V, 3.0V, 3.3V, etc.).

The Bandgap_ready signal need not be provided by first bias block 402. For instance, the Bandgap_ready signal may be provided by lower voltage supply, $V_{ddl}$.

Referring back to FIG. 5, diodes 504*a-c* are connected in series with each other for illustrative purposes. However, voltage drop circuit 502 can include diodes that are connected in parallel with each other. For example, high power applications may necessitate the use of diodes connected in parallel, so that voltage drop circuit 502 is capable of tolerating a power that exceeds the tolerance of the diodes connected in series. The voltage drop associated with diodes 504*a-c* need not necessarily be 0.7V. Diodes 504*a-c* can have any suitable voltage drop (e.g., 0.5V, 0.6V, 1.0V, etc.). Voltage drop circuit 502 can include any number of diodes, which need not necessarily have the same voltage drop. Voltage drop circuit 502 can include voltage drop elements other than diodes and may not include diodes at all.

In the embodiment of FIG. 5, Bias 1 is a current, which can be represented by the equation Bias1=$(V_{ddl}-V_{thl})/R_{ref}$, where $V_{ddl}$ indicates the voltage at the output of voltage drop circuit 502. The voltage at the output of voltage drop circuit 502 can be any suitable value. Thus, for a voltage other than $V_{ddl}$ at the output of voltage drop circuit 502, the equation for Bias1 should be modified accordingly. According to another embodiment, Bias1 is a voltage, which can be any suitable value (e.g., 3.0V, 3.5V, 5V, $V_{ddh}$, etc.).

In the embodiment of FIG. 5, multiplexer 408 operates based on currents. According to another embodiment, multiplexer 408 is configured to operate based on voltages. In yet another embodiment, multiplexer is configured to operate based on a combination of voltage(s) and current(s).

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A circuit having a higher voltage domain and a lower voltage domain, comprising:

a higher voltage supply for the higher voltage domain;

a lower voltage supply for the lower voltage domain;

a bias generator located in the higher voltage domain;

a bandgap bias generator located in the lower voltage domain configured to provide a first bias signal;

a backup bias generator located in the higher voltage domain configured to provide a temporary bias signal;

a multiplexer configured to select one of the temporary bias signal and the first bias signal to be used as a reference signal for the bias generator, wherein the higher voltage supply is configured to be powered on before the lower voltage supply is powered on.

2. The circuit of claim 1, wherein the backup bias generator provides a reference voltage before the lower voltage supply is powered on to prevent a voltage across a device of the circuit from exceeding a breakdown voltage of the device.

3. The circuit of claim 1, wherein the backup bias generator is deactivated in response to the multiplexer selecting the first bias signal.

4. The circuit of claim 1, wherein the multiplexer selects said one of the temporary bias signal and the first bias signal based on whether an amplitude of the first bias signal exceeds a threshold.

5. The circuit of claim 1, wherein the multiplexer selects said one of the temporary bias signal and the first bias signal based on stability of the first bias signal.

6. The circuit of claim 1, wherein the multiplexer selects said one of the temporary bias signal and the first bias signal based on whether the lower voltage supply is powered on.

7. The circuit of claim 1, wherein the bias generator generates a second bias signal based on the reference signal.

8. The circuit of claim 1, wherein the bias generator generates a common mode bias signal based on the reference signal.

9. The circuit of claim 1, wherein the backup bias generator includes a voltage drop circuit to drop the higher supply voltage by a fixed amount to provide a lower bias voltage upon which the temporary bias signal is based.

10. A method of powering on a circuit having a higher supply voltage and a lower supply voltage, the method comprising:

turning on the higher supply voltage;

generating a temporary bias signal based on the higher supply voltage;

turning on the lower supply voltage in response to generating the temporary bias signal;

generating a first bias signal based on the lower supply voltage; and selecting one of the temporary bias signal and the first bias signal to be used as a reference signal;

wherein generating the temporary bias signal prevents a voltage across a device of the circuit from exceeding a breakdown voltage of the device.

11. The method of claim 10, further comprising:

turning off the temporary bias signal in response to turning on the lower supply voltage.

12. The method of claim 10, wherein generating the temporary bias signal includes dropping the higher supply voltage by a fixed amount to provide a lower bias voltage upon which the temporary bias signal is based.

13. The method of claim 10, wherein selecting said one of the temporary bias signal and the first bias signal based on an amplitude of the first bias signal.

14. The method of claim 10, wherein selecting said one of the temporary bias signal and the first bias signal based on stability of the first bias signal.

15. The method of claim 10, further comprising generating a second bias signal based on the reference signal.

16. The method of claim 10, further comprising generating a common mode bias signal based on the reference signal.

17. A method of powering on a circuit having a higher supply voltage and a lower supply voltage, the method comprising:

turning on the higher supply voltage;

generating a temporary bias signal based on the higher supply voltage; and turning on the lower supply voltage in response to generating the temporary bias signal;

wherein generating the temporary bias signal prevents a voltage across a device of the circuit from exceeding a breakdown voltage of the device; and wherein generating the temporary bias signal includes mirroring the temporary bias signal.

18. The method of claim 17, further comprising:

turning off the temporary bias signal in response to turning on the lower supply voltage.

19. The method of claim 17, wherein generating the temporary bias signal includes dropping the higher supply voltage by a fixed amount to provide a lower bias voltage upon which the temporary bias signal is based.

20. The method of claim 17, further comprising: generating a first bias signal based on the lower supply voltage; and selecting one of the temporary bias signal and the first bias signal to be used as a reference signal.

21. The method of claim 20, wherein selecting said one of the temporary bias signal and the first bias signal based on an amplitude of the first bias signal.

22. The method of claim 20, wherein selecting said one of the temporary bias signal and the first bias signal based on stability of the first bias signal.

23. The method of claim 20, further comprising generating a second bias signal based on the reference signal.

24. The method of claim 20, further comprising generating a common mode bias signal based on the reference signal.

* * * * *